United States Patent [19]

Weidler

[11] 4,050,496
[45] Sept. 27, 1977

[54] CHAIN SHACKLE CONNECTOR

[76] Inventor: Erhard Alfred Weidler, Jahnstr. 32, 7084 Unterkochen, Germany

[21] Appl. No.: 600,618

[22] Filed: July 31, 1975

[30] Foreign Application Priority Data

Aug. 2, 1974 Germany ............................. 2437815

[51] Int. Cl.² ............................................. B60C 27/06
[52] U.S. Cl. .................................... 152/241; 152/233; 152/243; 24/241 P; 24/241 SL; 59/86
[58] Field of Search ............... 152/233, 241, 242, 243; 24/241 P, 241 PT, 241 SL; 59/86

[56] References Cited

U.S. PATENT DOCUMENTS

| 518,452 | 4/1894 | Holden | 24/241 P |
|---|---|---|---|
| 1,118,618 | 11/1914 | Babb | 24/241 P |
| 1,465,804 | 8/1923 | Bubb | 24/241 P |
| 1,556,428 | 10/1925 | Cunningham | 24/241 P |
| 1,726,659 | 9/1929 | Fayette et al. | 59/86 |
| 1,805,805 | 5/1931 | Camp | 59/86 |
| 2,436,792 | 3/1948 | Dahlander | 24/241 P |
| 2,462,965 | 3/1949 | Henderson | 24/241 P |
| 3,367,001 | 2/1968 | Raschke | 24/241 P |

*Primary Examiner*—Drayton E. Hoffman
*Attorney, Agent, or Firm*—Haynes N. Johnson

[57] ABSTRACT

A tire or similar chain shackle connector having an inlet for receiving links to be connected, the end of the chain at one side of the inlet being solid and at the other side having holes for receiving a connector, and a closure member having a recess for receiving the solid end of the shackle and apertures or holes at the other end of the closure member through which the connector can be inserted.

9 Claims, 10 Drawing Figures

CHAIN SHACKLE CONNECTOR

The present invention relates to a chain shackle connector for link chains, particularly tire chains, having a substantially C-shaped main body with an inlet slot for chain links which are to be connected together, in which the inlet slot can be bridged over by a closure piece which is held on one of the two ends of the main body by a connecting part arranged transverse to the plane of the main body in aligned receiving holes in the main body and in the closure piece.

A chain shackle connector of the above general type is known in which the closure piece is held swingably at one end of the main body by the connecting part and can be swung out of an open position into a closed position and vice versa. In order to make certain with this chain shackle connector that it remains in its closed position, an additional safety element is required. This safety element is formed by a ring having an annular groove which is supported for translation and rotation on the closure piece and has associated with it a guide bar which extends over a part of the closure piece. In the open position of the chain shackle connector, the ring is pushed over the end of the closure piece which faces the connecting part. In order to be able to effect this displacement, both the end of the closure piece and the end of the main body facing it are so flattened on facing sides that their non-flattened parts in the closed position of the shackle connector form a cylindrical surface onto which the ring can be pushed. After the displacement of the ring, the inner groove of the latter is no longer in engagement with the guide bar and it can be swung. After the swinging, the opposing end surfaces of the ring and of the guide bar prevent the ring being pushed back into its starting position in which it makes the opening of the chain shackle connector possible. In order to be able to transmit forces in the closed position of the known chain shackle in the region of the inlet slot, the flattened ends of the main body and of the closure piece are provided with projection and recesses associated therewith which engage in each other in the closed position of the chain shackle connector in order to transmit forces.

The known chain shackle connector is not fully satisfactory for various reasons. Thus, in addition to the main body, the closure piece and the connecting part, a safety element is also required. This safety element can not only be easily lost but means are also lacking which assure its being held in the closed position. The nature of the transmission of force between the ends of the main body is inadequate since the cross section of the projections which effect the transmission of the force is limited. Aside from its functional defects, the known chain shackle connector has the disadvantage that its construction is complicated and its manufacture expensive.

One of the objects of the present invention is to provide a chain shackle connector of the type in question which does not have the defects of known shackle connectors but rather, while being of simple construction and consisting of as few as possible parts, permits easy mounting and removal as well as the transmission of large forces by the closure piece.

This object is achieved, in accordance with the present invention, in that the closure piece is provided on its end facing away from its end which has at least one receiving hole for the connecting part, with a recess which can be brought over the end of the main body which does not have a receiving hole, only when the connecting part is not fixedly mounted in place on the ends of the main body.

The chain shackle connector has the advantage that it is possible to dispense with a safety element since the securing of the closing piece in the closed position is effected by the shape and arrangement of the three parts of the shackle. Since the closing piece surrounds the bore-less or solid end of the main body, it can transmit large forces and the danger of breakage present in known shackles in the region of the place of closing is eliminated. Further details of the chain shackle connector of the invention can be noted from the claims and the following description of several illustrative embodiments.

Figure 1:
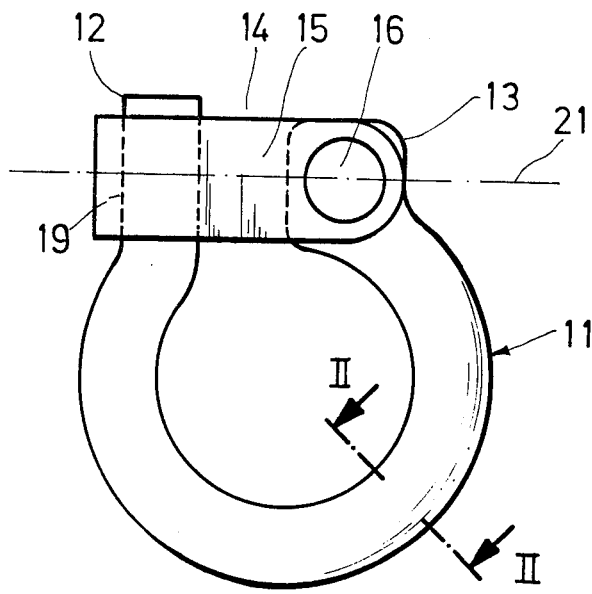
FIG. 1 is a side view of a first chain shackle connector.
Figure 3:
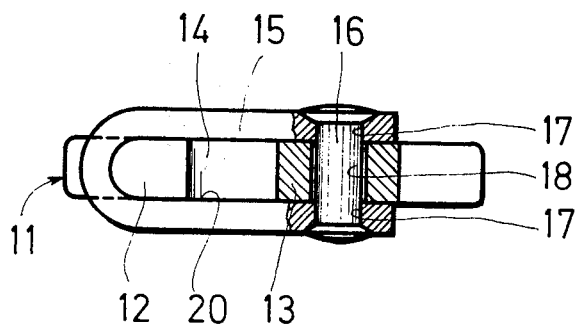
FIG. 3 shows, partially in section, a plan view of the chain shackle connector of FIG. 1.

The chain shackle connector shown in FIGS. 1 and 3 has a main body 11 with two ends 12 and 13. The inlet slot 14 present between the ends 12 and 13 is bridged over by a closure piece 15 which is developed in the shape of a yoke. The closure piece is held in the position shown in the drawing by a connecting part 16 whose end is developed in the form of a rivet head. As can be noted from FIG. 3, the end 13 of the main body 11 and the end of the closure piece 15 associated with said end are provided with receiving holes 17 and 18 for the connecting part 16.

The end 12 of the main body 11 has a straight section 19 which protrudes into a recess or opening 20 in the closing piece 15 and extends perpendicular to the longitudinal axis 21 of the closure piece 15. By the linear development of the section 19 and the manner in which it is arranged in the recess 20 of the closure piece 15, assurance is had that the closure piece 15 in its mounted position cannot carry out any swinging movements and cannot open under load.

Figure 2:
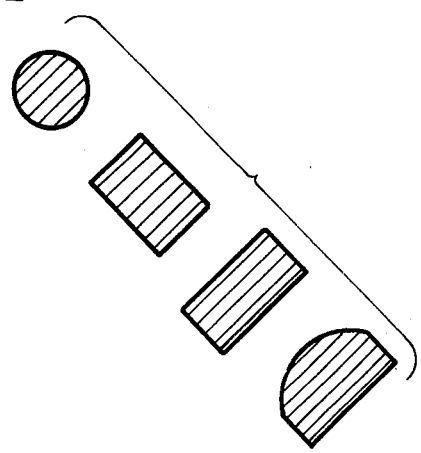
FIG. 2 shows various possible cross sectional shapes along the line II—II in FIG. 1.
Figure 4:
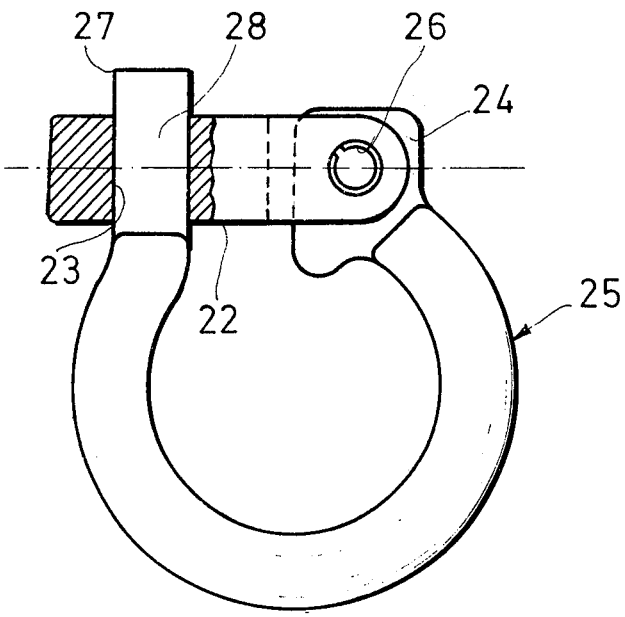
FIG. 4 shows, partially in section, a side view of a chain shackle connector of modified construction.
Figure 5:
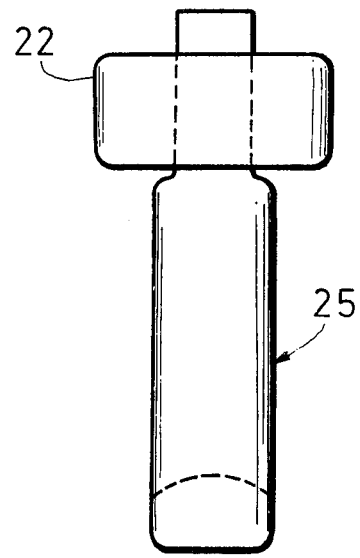
FIG. 5 is a front view of the chain shackle connector of FIG. 4.
Figure 6:
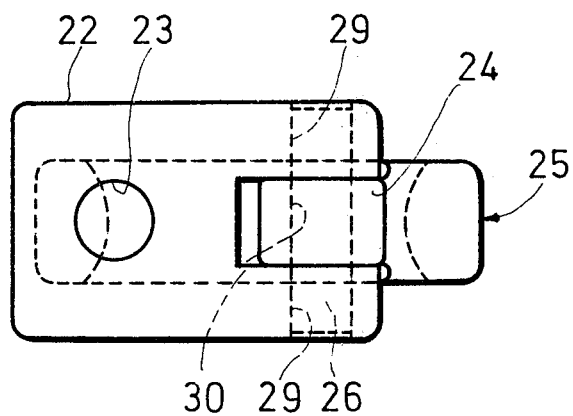
FIG. 6 is a top view of the chain shackle connector of FIGS. 5 and 6.

The construction of the chain shackle connector of FIGS. 4 to 6 corresponds essentially to the construction of the chain shackle connector of FIGS. 1 to 3. While in the embodiment which was first described a yoke-shaped closure piece 15 was used, in this case a cap-shaped closure piece 22 having recess 23 is employed. This closure piece 22 is fastened to the end 24 of a main body 25 by means of a connecting part 26. The second end 27 of the main body is provided, in this case also, with a straight section 28 which extends into the recess 23. The fork-shaped ends of the closure piece 22 and the end 24 of the main body 25 are provided with receiving holes 29 and 30 for the connecting part 26.

Figure 7:
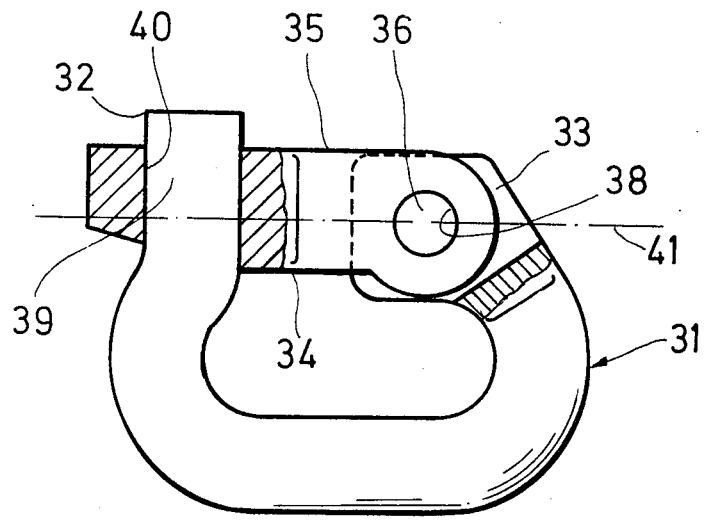
FIG. 7 shows, partially in section, a side view of a third chain shackle connector.
Figure 8:
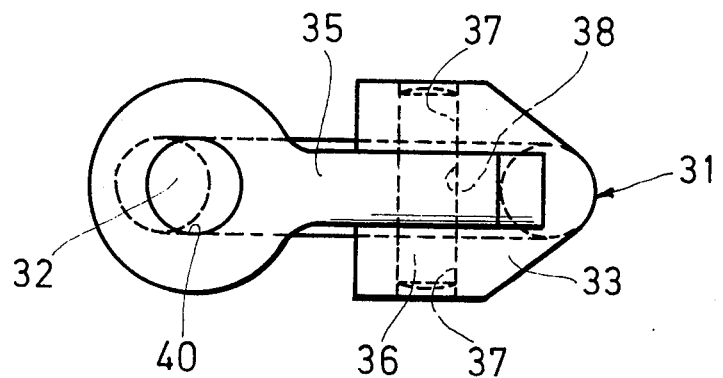
FIG. 8 is a top view of the chain shackle connector of FIG. 7.

The chain shackle connector in accordance with FIGS. 7 and 8 has a main body 31 with ends 32 and 33. The inlet slot 34 defined by the ends 32 and 33 is bridged over by a closure piece 35 which is held in its closed position by a connecting part 36. The end 33 of the main body 31 is fork-shaped and provided with receiving holes 37. Furthermore, a receiving hole 38 is arranged in the closure piece 35. The end 32 of the main body 31 has a straight section 39 which protrudes through the recess 40 and extends perpendicular to the longitudinal axis 41. In the case of this chain shackle connector also, swinging movements of the closure piece 35 around the connecting part 36 are impossible.

Figure 9:
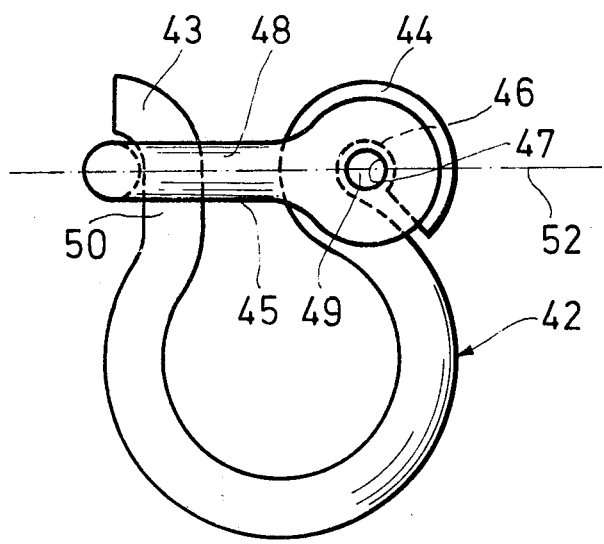
FIG. 9 shows a fourth chain shackle connector.
Figure 10:
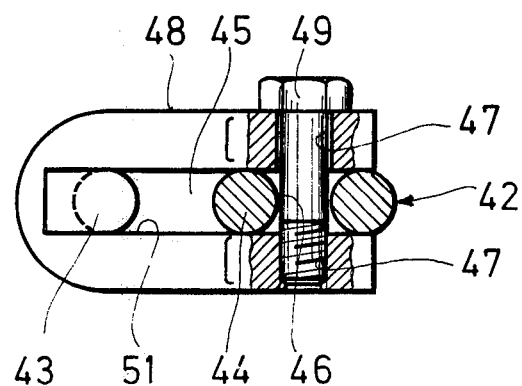
FIG. 10 shows, partially in section, a top view of the chain shackle connector of FIG. 9.

In the embodiment shown in FIGS. 9 and 10, the main body 42 is formed of a piece of wire whose ends 43 and 44 define an inlet slot 45. The end 44 is bent to form an eye and forms a receiving hole 46 for a connecting part 49 which is furthermore arranged in receiving holes 47 of a closure piece 48. The end 43 of the main body 42 has a straight section 50 which extends through a recess 51 in the closure piece 48. The section 50 is perpendicular to the longitudinal axis 52 of the closing piece 48.

The above description of the chain shackle connectors shown makes it clear that due to the asymmetrical construction of the main body employed, it is possible to make the end of the main body which bears the connecting part so strong that fractures can be prevented at this place. Since special safety elements are unnecessary, the other end of the closure body can remain unweakened. Due to the form-locking between the main body and the closure piece, a dependable connection is created which, however, can nevertheless be easily mounted and removed.

What is claimed is:

1. A chain shackle connector for link chains, particularly tire chains, having a substantially C-shaped main body with an inlet slot for chain links which are to be connected to each other, in which the inlet slot can be bridged over by a closure piece which is held at one of the two ends of the main body by a removable connecting part which is arranged transversely to the plane of the main body in aligned receiving hole means in the main body and one end of the closure piece, characterized by the fact that the closure piece is provided on its end facing away from its end which has the receiving hole means for the connecting part, with a recess which can be brought over the other end portion of the main body, which has no receiving hole, only when the connecting part is not in connecting position in the hole means and when said connecting part is in connecting position in the hole means, said other end of said connecting part cannot be removed from said other end portion of the main body.

2. A chain shackle connector according to claim 1, characterized by the fact that the end of the closure piece which can be connected by the connecting part to the main body is fork shaped.

3. A chain shackle connector according to claim 1, characterized by the fact that the end of the closure piece which can be connected by the connecting part to the main body is surrounded in fork-like manner by the main body.

4. A chain shackle connector according to claim 1, characterized by the fact that the closure piece is yoke shaped.

5. A chain shackle connector according to claim 2, characterized by the fact that the closure piece is yoke shaped.

6. A chain shackle connector according to claim 4, characterized by the fact that the main body consists of a bent shaped part whose one end forms an eye creating a receiving hole for the connecting part.

7. A chain shackle connector according to claim 1, characterized by the fact that the end of the main body which is without receiving hole means has a straight section which extends into the recess of the closure piece, such straight section extending perpendicular to the longitudinal axis of the closure piece.

8. A chain shackle connector according to claim 2, characterized by the fact that the end of the main body which is without receiving hole means has a straight section which extends into the recess of the closure piece, such straight section extending perpendicular to the longitudinal axis of the closure piece.

9. A chain shackle connector according to claim 6, characterized by the fact that the end of the main body which is without receiving hole means has a straight section which extends into the recess of the closure piece, such straight section extending perpendicular to the longitudinal axis of the closure piece.

* * * * *

UNITED STATES PATENT OFFICE
CERTIFICATE OF CORRECTION

Patent No. 4,050,496            Dated September 27, 1977

Inventor(s) Erhard Alfred Weidler

It is certified that error appears in the above-identified patent and that said Letters Patent are hereby corrected as shown below:

Column 1, Line 40 "projection" should be -- projections--

Column 3, Line 45 insert -- other -- before the first occurrence of "end".

Signed and Sealed this

Third Day of January 1978

[SEAL]

Attest:

RUTH C. MASON
Attesting Officer

LUTRELLE F. PARKER
Acting Commissioner of Patents and Trademarks